W. G. ABRAMSON, R. J. KENNEDY & E. M. McMILLAN.
ADJUSTABLE STAND ATTACHMENT FOR BEDS.
APPLICATION FILED APR. 14, 1914.
1,171,826.
Patented Feb. 15, 1916.
2 SHEETS—SHEET 1.
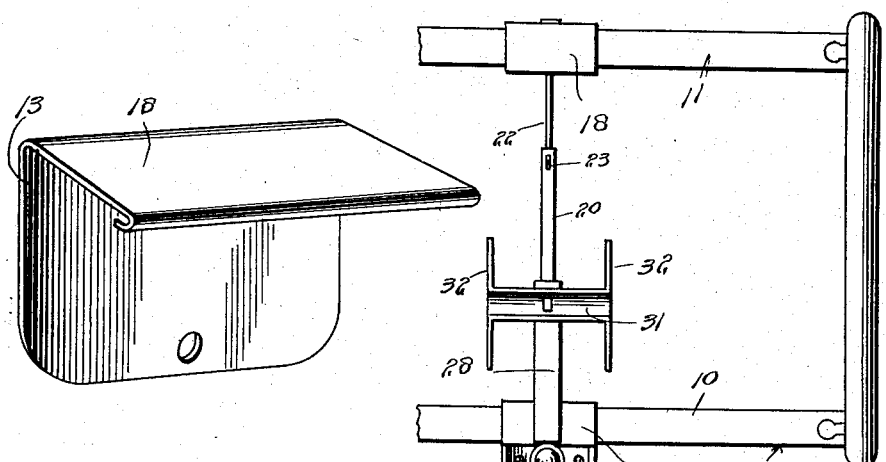
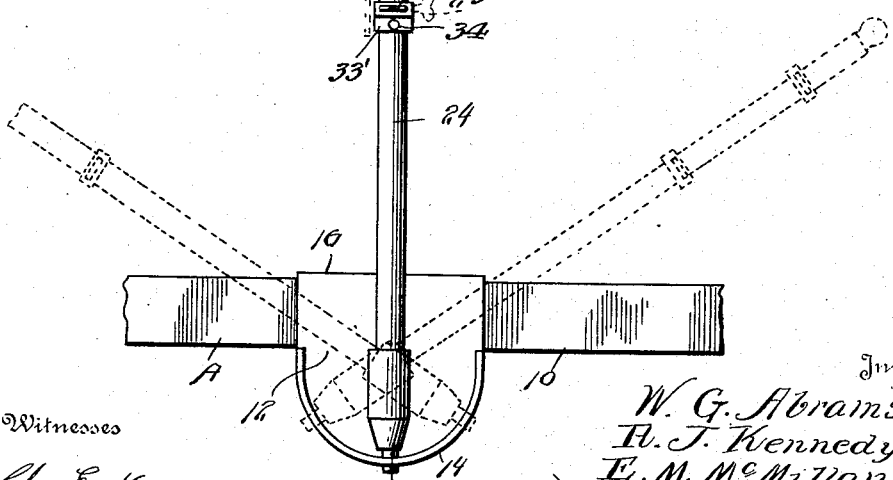

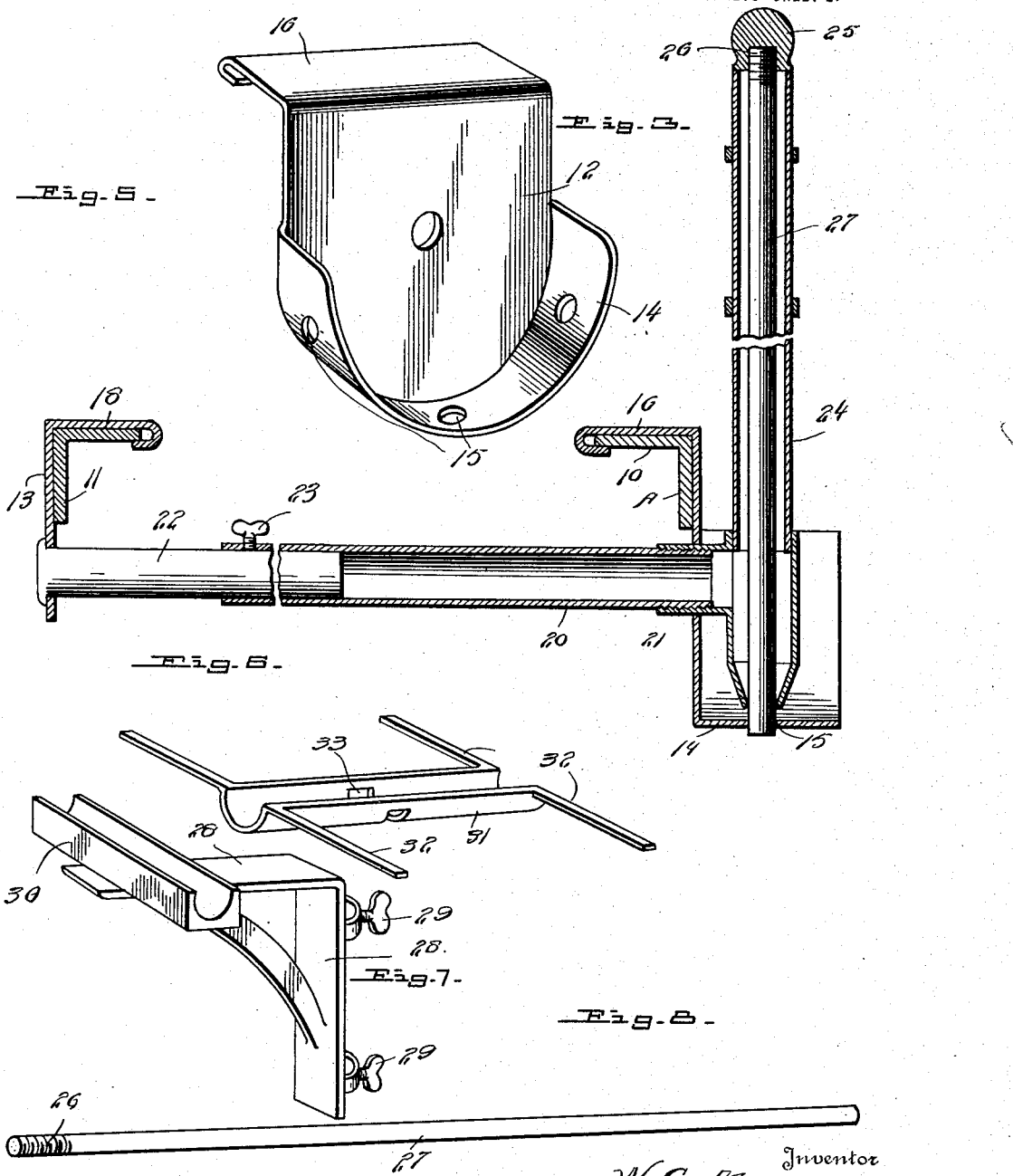

UNITED STATES PATENT OFFICE.

WILLIAM G. ABRAMSON, ROYAL J. KENNEDY, AND EPHRAIM M. McMILLAN, OF OAKLAND, CALIFORNIA.

ADJUSTABLE STAND ATTACHMENT FOR BEDS.

1,171,826.  Specification of Letters Patent.  Patented Feb. 15, 1916.

Application filed April 14, 1914. Serial No. 831,791.

*To all whom it may concern:*

Be it known that we, WILLIAM G. ABRAMSON, ROYAL J. KENNEDY, and EPHRAIM M. McMILLAN, citizens of the United States, residing at Oakland, in the county of Alameda, State of California, have invented certain new and useful Improvements in Adjustable Stand Attachments for Beds; and we do hereby declare the following to be a full, clear, and exact description of the invention, such as will enable others skilled in the art to which it appertains to make and use the same.

This invention relates to adjustable stand attachments for beds.

The object of the invention resides in the provision of a device of the character named which can be readily secured to a bed of any type and which is capable of adjustment so as to support a tray, or the like in proper relation to an occupant of the bed irrespective of the position occupied by said occupant.

A further object of the invention resides in the provision of a device of the character referred to which will be simple in construction, efficient in use, and which can be manufactured at a comparatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view showing the device associated with a bed; Fig. 2, a side view of what is shown in Fig. 1 with the device shown in several adjusted positions in dotted lines; Fig. 3. an enlarged section on the line 3—3 of Fig. 2; Fig. 4, a perspective view of one of the bearings of the device; Fig. 5, a perspective view of the other bearing of the device; Fig. 6, perspective view of the tray holding element; Fig. 7, a perspective view of the bracket which supports the tray holding element, and Fig. 8, a perspective view of the locking rod by means of which the device is secured in certain adjustments.

Referring to the drawings A indicates a bed of ordinary construction and including the usual side rails 10 and 11 which support the improved device.

The invention proper is shown as comprising bearings 12 and 13. The bearing 12 is provided with an arcuate lower edge and extending outwardly from this lower edge is an arcuate flange 14 provided at spaced intervals with openings 15 for a purpose that will presently appear. Secured to the upper end of the bearings 12 is a hook element 16 which is detachably engaged with the side rail 10 to support the bearing 12 in suspension. The bearing 13 has secured to its upper end a hook element 18 which is detachably engaged with the side rail 11 to support the bearing 13 in suspension. Rotatably mounted in the bearing 12 is a tubular member 20 which has engaged on its outer end a coupling 21 for a purpose that will presently appear. Rotatably mounted in the bearing 13 is a rod 22 which has its inner end engaged in the inner end of the member 20 and secured in place by means of a set screw 23 carried by the member 20. By this construction it will be obvious that the member 20 and rod 22 can be adjusted longitudinally so as to permit of the bearings 12 and 13 being engaged with the side rails of beds of different widths. Secured to the coupling 21 at right angles to the member 20 is a tubular member 24 which has engaged on the free end thereof a cap 25 having a threaded recess 26 therein. Secured in the recess 26 is one end of a locking rod 27, said rod extending through the member 24 and the coupling 21 for detachable engagement in the openings 15 respectively whereby the member 24 may be locked in a desired adjustment as will be obvious. If it is desired to change the position of the member 24 it is only necessary to lift the cap 25 from the free end of the member 24. This movement of said cap will in turn lift the rod 27 out of the opening 15 in which it is engaged when the member 20 and rod 22 may be rotated to position the member 20 in a new adjustment. Rotatably and slidably mounted on the member 24 is a bracket 28 which is adapted to be secured against relative movement with respect to the member 24 by means of set screws 29 carried by the coupling. Secured on the bracket 28 by means of a set screw 29' is a grooved block 30 in which is seated a semi-cylindrical member 31 provided with arms 32. This member is provided with a transverse slot 33 in which the set screw 29' is engaged and whereby the member 31 may be adjusted as will be obvious. The member 31 in conjunction with the arms 32 serve to support a tray, shelf or the like. In order to hold the bracket 28 against downward movement on the member 24 when the set screws 29 are released there is adjustably mounted on the member 24 a collar 33' carrying a set screw 34.

What is claimed is:—

In a device of the class described, the combination of a pair of spaced bearings provided with means for attachment to respective side rails of a bed, a shaft journaled in said bearings, an arcuate flange on one of said bearings disposed concentrically with respect to the axis of rotation of the shaft, said flange being provided with spaced openings, a tubular member secured to the end of the shaft adjacent the flange bearing, a locking rod carried by said tubular member and interchangeably engageable in the openings of the flange to lock the shaft against rotation, and a supporting member carried by said member.

In testimony whereof, we affix our signatures in the presence of two witnesses.

WILLIAM G. ABRAMSON.
ROYAL J. KENNEDY.
EPHRAIM M. McMILLAN.

Witnesses:
A. E. WEYERMAN,
W. N. COLLIER.

Copies of this patent may be obtained for five cents each, by addressing the "Commissioner of Patents, Washington, D. C."